(12) United States Patent
Jeong et al.

(10) Patent No.: US 9,114,767 B2
(45) Date of Patent: Aug. 25, 2015

(54) BUMPER BACK BEAM FOR VEHICLE

(75) Inventors: Un Deok Jeong, Gyeonggi-do (KR);
Joon Yub Sung, Gyeonggi-do (KR)

(73) Assignee: UN DEOK JEONG, Gyeonggi-do (KR)

( * ) Notice: Subject to any disclaimer, the term of this patent is extended or adjusted under 35 U.S.C. 154(b) by 0 days.

(21) Appl. No.: 14/118,060

(22) PCT Filed: May 17, 2012

(86) PCT No.: PCT/KR2012/003915
§ 371 (c)(1),
(2), (4) Date: Nov. 15, 2013

(87) PCT Pub. No.: WO2012/157986
PCT Pub. Date: Nov. 22, 2012

(65) Prior Publication Data
US 2014/0191520 A1    Jul. 10, 2014

(30) Foreign Application Priority Data

May 18, 2011  (KR) .......... 10-2011-0046970
May 18, 2011  (KR) .......... 10-2011-0046971

(51) Int. Cl.
*B60R 19/02* (2006.01)
*B60R 19/18* (2006.01)

(52) U.S. Cl.
CPC ......... *B60R 19/18* (2013.01); *B60R 2019/1853* (2013.01); *B60R 2019/1866* (2013.01)

(58) Field of Classification Search
CPC ........ B60R 19/34; B60R 19/18; B60R 19/40; B60R 2019/1813; B60R 22/1951; B60K 1/04; B60K 2001/0438; B62D 25/20; B62D 21/152; B62D 25/082; B62D 25/2018; B62D 21/02; B62D 21/15; B62D 21/157; B62D 25/025; B62D 25/2036; B62D 23/00; B62D 23/005; B62D 29/008; B62D 65/00; B62D 65/04
USPC ............... 293/120, 151, 154, 155, 132–133, 293/121–122, 102, 113, 115, 117; 296/191, 296/203.02, 146.6
See application file for complete search history.

(56) References Cited

U.S. PATENT DOCUMENTS 6,371,540 B1 * 4/2002 Campanella et al. ......... 293/102
6,406,081 B1 * 6/2002 Mahfet et al. ................. 293/133
(Continued)

FOREIGN PATENT DOCUMENTS

KR    10-1998-0044140    9/1998
KR    10-2008-0010639    1/2008
(Continued)

*Primary Examiner* — Glenn Dayoan
*Assistant Examiner* — Sunsurraye Westbrook
(74) *Attorney, Agent, or Firm* — Kirton McConkie; Evan R. Witt (57) ABSTRACT

A bumper back beam for a vehicle includes an impact part positioned in a center portion, and tower parts formed at rear portions of both sides of the impact part so as to be fixed to crush boxes on the front ends of side members of a vehicle body, and is characterized in that the impact part is formed such that the section of the impact part has an inner space which is open towards the opposite inside portions of a bumper, and a stiffener is received in the inner space, wherein the inner space and the stiffener are formed with a curvature which is smaller than that of the back beam such that clearances are formed at both sides between the inner space and the stiffener. The bumper back beam improves impact resistance and maintains appropriate deformation while preventing damage to the side members, when a bumper is impacted.

12 Claims, 7 Drawing Sheets

(56) References Cited

U.S. PATENT DOCUMENTS

| | | |
|---|---|---|
| 6,688,661 B2 * | 2/2004 | Yamamoto .................... 293/102 |
| 6,886,873 B2 * | 5/2005 | Weykamp et al. ............. 293/133 |
| 6,923,494 B2 * | 8/2005 | Shuler et al. ............. 296/187.05 |
| 7,340,833 B2 * | 3/2008 | Weissenborn et al. ....... 29/897.2 |
| 8,016,331 B2 * | 9/2011 | Ralston et al. ................ 293/120 |
| 2004/0201255 A1 * | 10/2004 | Jonsson ................... 296/187.03 |

FOREIGN PATENT DOCUMENTS

| KR | 10-2009-0030157 | 3/2009 |
|---|---|---|
| KR | 10-2010-0046560 | 5/2010 |

* cited by examiner

BUMPER BACK BEAM FOR VEHICLE

TECHNICAL FIELD

The present invention relates to a bumper back beam for a vehicle and, more particularly, to a bumper back beam for a vehicle, wherein a stiffener is inserted into a back beam, which is made from a synthetic resin material and connects side members, and the back beam and the stiffener are formed in different curvatures from each other such that impact resistance can be improved and appropriate deformation is maintained while preventing damage to the side members when an impact is applied to the bumper.

DESCRIPTION OF THE PRIOR ART

In general, a bumper reinforcement member for a vehicle is mounted on the rear portion of the bumper of a vehicle so as to relieve an impact in a collision.

Figure 1:
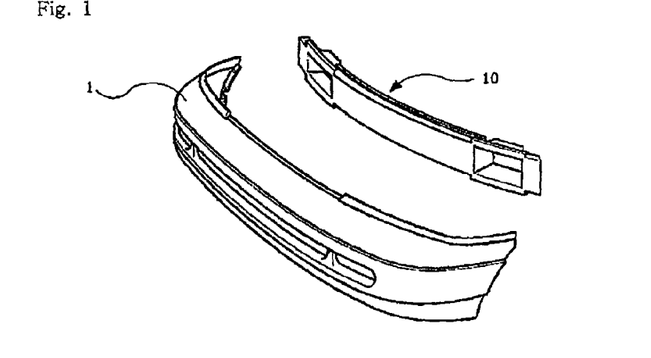
FIG. 1 is a perspective view of a general vehicle bumper and a vehicle bumper reinforcement member, which are in a disassembled state.

FIG. 1 is a perspective view of a bumper 1 for a vehicle and a bumper reinforcement member 10 for a vehicle, which are in a disassembled state. As shown in FIG. 1, the bumper reinforcement member 10 for a vehicle is mounted on the rear portion of the bumper 1 so as to relieve an impact in a collision.

Figure 2:
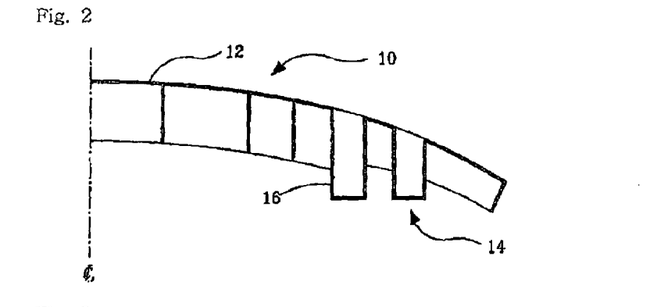
FIG. 2 is a sectional view of a prior art vehicle bumper reinforcement member.

FIG. 2 is a partial sectional view of the bumper reinforcement member for a vehicle of FIG. 1.

The reinforcement member 10 includes a main body 12 which is formed in a bracket shape according to the shape of the bumper 1 so as to be positioned in the center, and one or more towers 14 which are provided at both end portion sides of the main body 12 and have vertical side surfaces 16.

The towers 14 are mounted on a vehicle body (not shown) at a base plate and serve to relieve the compression force or tension force which is generated in the bumper itself in a collision such that the compression force or tension force is prevented from being directly transmitted but is transmitted after the relief. Therefore, deformation is generated the most in the connection portions between the inside surfaces of the towers, which are positioned at the innermost positions, and the main body in a collision.

Figure 3:
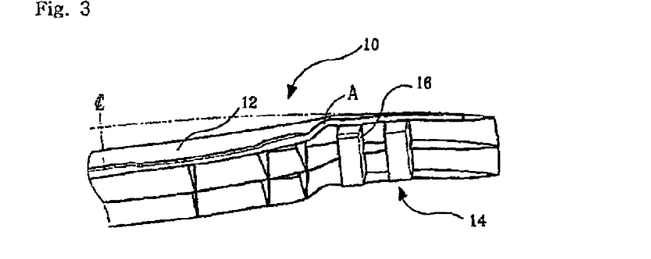
FIG. 3 is a view showing a state, in which the prior art bumper reinforcement member is deformed together with side members by a collision.

A bumper which is provided with the towers 14 having such vertical side surfaces has a problem that the bumper should be entirely changed with a new one even at a weak collision since the towers and reinforcement structures have serious deformation by the force which is transmitted in a front or side collision as shown in portion A of FIG. 3, and the deformation is permanent.

Figure 4:
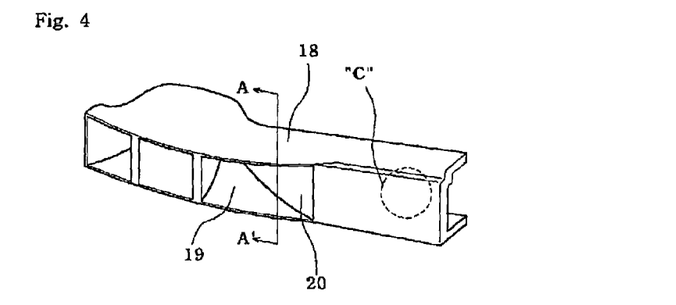
FIG. 4 is a perspective view of another prior art vehicle bumper.
Figure 5:
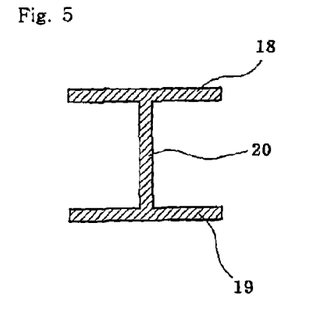
FIG. 5 is a sectional view showing a part taken along line A-A' of FIG. 4.
Figure 6:
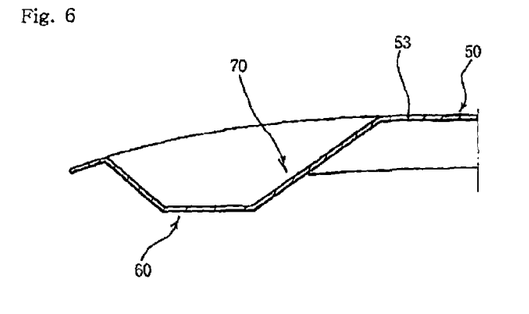
FIG. 6 is an expanded cross-sectional view showing one side end portion of the prior art bumper reinforcement member.
Figure 7:
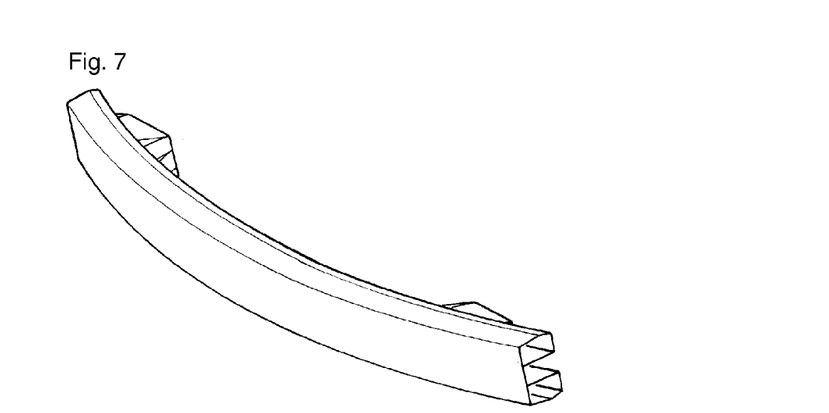
FIG. 7 is a perspective view showing a prior art steel structure.

In order to resolve the problem as mentioned above, there has been suggested a bumper as disclosed in Korean patent No. 0340464, wherein coupling parts between the body of a reinforcement member and towers are formed to be inclined, as shown in FIG. 4 and FIG. 5, such that deformation in a collision is minimized and simultaneously permanent deformation is reduced so as to extend the lifespan of the bumper.

However, as shown in FIG. 4 and FIG. 5, the prior art bumper has the coupling parts which are formed to be inclined between the body of the reinforcement member and the towers such that an inclination surface 20 supports the centers of an upper plate 18 and a lower plate 19 as shown in FIG. 5. Therefore, connection parts are strengthened so as to increase a generated load. However, generated deformation cannot be appropriately absorbed due to the strengthened connection parts and parts C of the main body are likely to break when an impact of a predetermined level or higher is applied. Therefore, there is still a problem that collision energy which is absorbed by the bumper is not high enough due to the breaking.

Further, the end portions of the upper plate and the lower plate press a bumper cover so that the bumper cover is likely to be damaged, and the end portions of the upper plate and the lower plate are bent so that a part of the reinforcement member is damaged in a collision in the prior art bumper.

Meanwhile, there has been suggested a bumper reinforcement member in Korean Patent Application No. 2007-49151 which was filed by the present applicant, wherein allowable strength is increased by changing the structure of the shape of connection parts between an impact part which is positioned at a front portion and tower parts which are fixed to a vehicle body such that a part of a bumper reinforcement member is subject to appropriate deformation corresponding to an applied impact even when a large impact is applied thereto.

Figure 8:
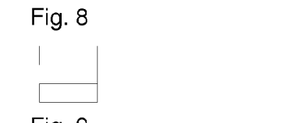
FIG. 8 is a sectional view showing the prior art steel structure.
Figure 9:
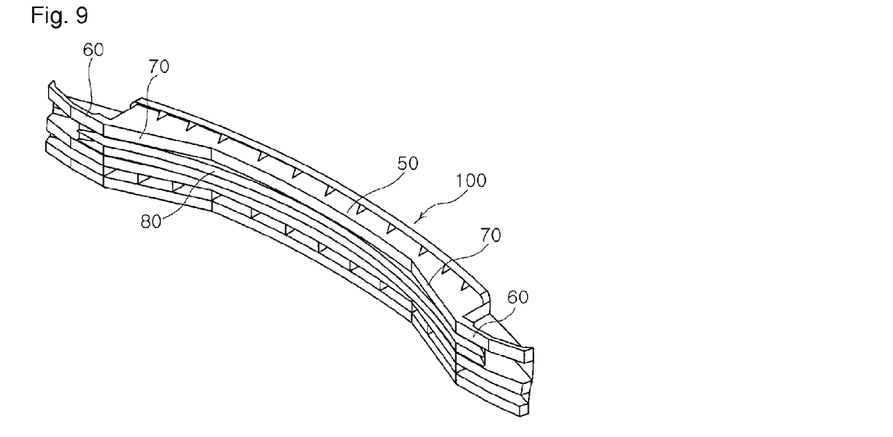
FIG. 9 is a view showing a state, in which a stiffener is assembled into a back beam.
Figure 10:
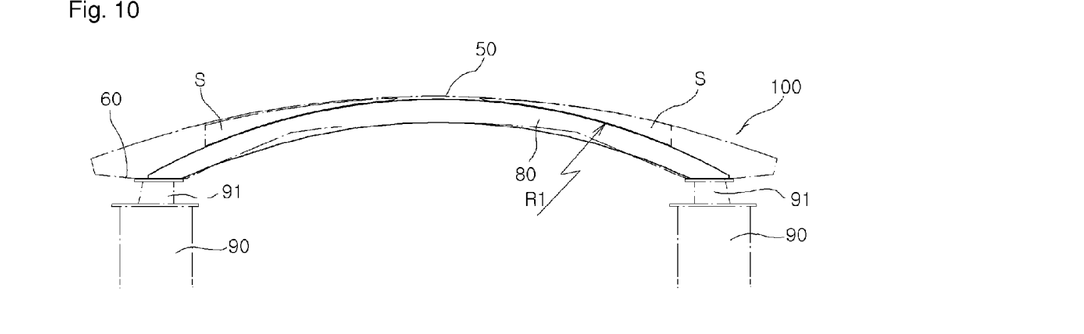
FIG. 10 is a plane view showing a difference in the curvature of the stiffener which is mounted in the back beam.

Further, as shown in FIG. 8 and FIG. 9, there has been suggested a reinforcement member, wherein the reinforcement member is made from a steel material and formed with smoothly curved surfaces such that an impact part in the center protrudes with a section in the shape of a "B".

However, there are still problems that, even though the rigidity itself of a bumper reinforcement member may be improved through the various change in shape and structures, the tower parts and the side members on which the tower parts are mounted are largely damaged in the mounted state thereof if a strong impact is transmitted through the front impact part in a collision.

That is, if a strong impact is transmitted through the central impact part, the direction of the impact is changed in a direction that the side members at both sides are open such that the side members are largely damaged in the process of such opening.

Further, the impact parts which are mounted on the side members are largely damaged or deformed in the opening direction.

SUMMARY OF THE INVENTION

The present invention has been made to solve the above-mentioned problems of the prior art, and an objective of the invention is to provide a bumper back beam for a vehicle, wherein an impact part and side members are prevented from being damaged or deformed in the opening direction of the side members.

It is another objective of the present invention to provide a bumper back beam for a vehicle which can increase durability and final impact allowance.

In order to achieve the above mentioned objectives, according to a first exemplary embodiment of the present invention, there is provided a bumper back beam 100 for a vehicle, comprising:

an impact part 50 positioned in a center portion; and tower parts 60 formed at both sides of the rear portion of the impact part 50 such that the tower parts 60 are fixed to crush boxes 91 which are mounted on the front ends of side members 90 of a vehicle body, wherein the bumper back beam 100 for a vehicle is characterized in that the impact part 50 is formed such that the section of the impact part 50 has an inner space 55 which is open towards the opposite inside portion of a bumper, and a stiffener 80 is received in the inner space 55, wherein the inner space 55 and the stiffener 80 are formed with a curvature R1 which is smaller than that of the back beam 100 such that clearances S are formed at both sides of the stiffener 80 between the inner space 55 and the stiffener 80.

Herein, the stiffener 80 is provided with a plurality of ribs 81 for filling the clearances S so as to further reinforce the allowable strength.

Further, the end portions of the stiffener 80 extend to the positions of the tower parts 60 of the vehicle back beam 100 so as to be fixed to the crush boxes 91.

Furthermore, the stiffener 80 is preferably formed to have a closed sectional portion so as to improve the allowable strength.

The impact part 50 is formed such that the section of the impact part 50 respectively has an outside space 56 which is open towards a bumper side and an inner space 55 which is open towards the opposite inside of the bumper.

Meanwhile, according to a second exemplary embodiment of the present invention, there is provided a bumper back beam 100 for a vehicle, comprising:

an impact part 50 positioned in a center portion; and tower parts 60 formed at both sides of the rear portion of the impact part 50 such that the tower parts 60 are fixed to crush boxes 91 which are mounted on the front ends of side members 90 of a vehicle body, wherein the bumper back beam 100 for a vehicle is characterized in that the vehicle back beam 100 is formed with closed sections and a stiffener 80 which is formed with a smaller curvature R1 than that of the back beam 100 is received in the vehicle back beam 100 such that clearances S are formed at both sides of the stiffener 80 between the back beam 100 and the stiffener 80.

At this time, the back beam 100 is made from a metal material and provided with a mounting space 55a between upper and lower closed sectional portions 56a and 57a, and the stiffener 80 which is made from a metal material may be received in the mounting space 55a, wherein the stiffener 80 is formed with a plurality of protruding ribs 81 for filling the clearances S so as to further reinforcing allowable strength.

Further, the end portions of the stiffener 80 extend to the positions of the tower parts 60 of the vehicle back beam 100 so as to be fixed to the crush boxes 91.

Furthermore, the stiffener 80 is preferably formed to have a closed sectional portion so as to improve allowable strength.

According to the above configuration of the present invention, the stiffener 80 having the curvature R1 which is smaller than that of the back beam 100 is further provided in the inner space 55 of the back beam 100 such that the clearances S are formed at both sides thereof.

Therefore, the final impact allowance may be increased.

Further, in the case that an impact is applied, appropriate deformation can be maintained and the impact part and the side members can be prevented from being excessively deformed or damaged in the opening direction thereof, thereby increasing the durability of a product and the final impact allowance thereof.

BRIEF DESCRIPTION OF THE DRAWINGS

The above and other features of the present invention will now be described in more detail with reference to certain exemplary embodiments thereof illustrated the accompanying drawings which are given hereinafter by way of illustration only, and thus are not limitative of the present invention, and wherein:

FIG. 9 to FIG. 17 are perspective views showing a bumper back beam for a vehicle according to a first preferred embodiment of the present invention, wherein

FIG. 18 to FIG. 23 show a bumper back beam for a vehicle according to a second preferred embodiment of the present invention, wherein

FIG. 25a to FIG. 25c are sectional views showing embodiments for stiffeners in different shape.

BEST MODE(S) FOR CARRYING OUT THE INVENTION

Hereinafter, preferred exemplary embodiments of the present invention will be described in detail with reference to the accompanying drawings.

According to the present invention, a vehicle back beam 100 is formed without a curve, and positioned at the front portion of a vehicle body so as to be substantially transmitted with impacts and to absorb the impacts. The vehicle back beam 100 mainly includes an impact part 50, and tower parts 60 which are respectively mounted on the stays of the side members 90 of the vehicle body at both sides of the impact part 50.

At this time, crush boxes 91 may be mounted between the side members 90 and the tower parts 60.

Figure 13:
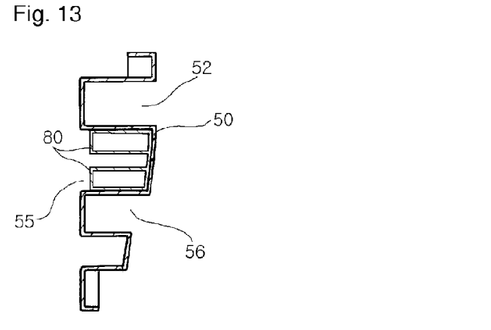
FIG. 13 is a sectional view showing the profile of the bumper back beam of the present invention in an assembled state.
Figure 14:
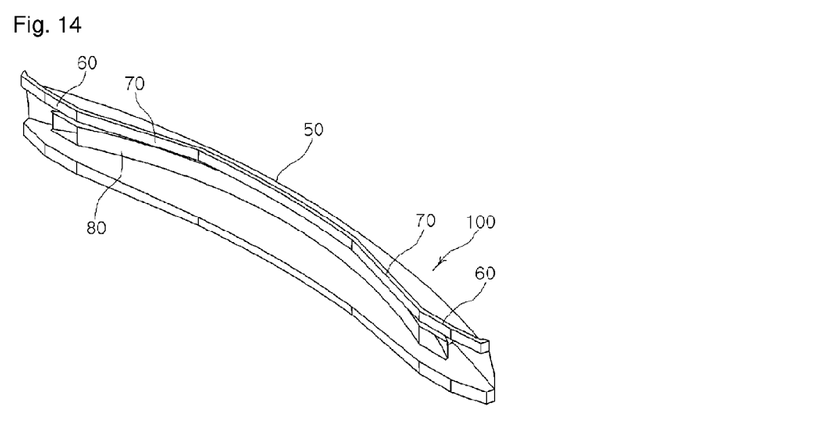
FIG. 14 is a perspective view showing a state, in which the stiffener is assembled into the back beam.
Figure 15:
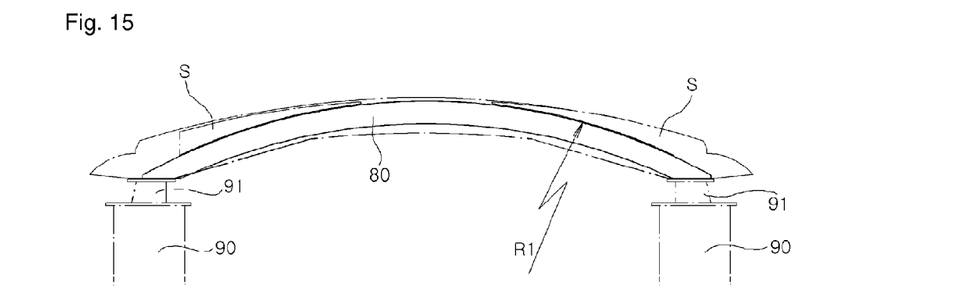
FIG. 15 is a plane view showing a mounted state for explaining a difference in the curvature of the stiffener which is mounted in the back beam.
Figure 16:
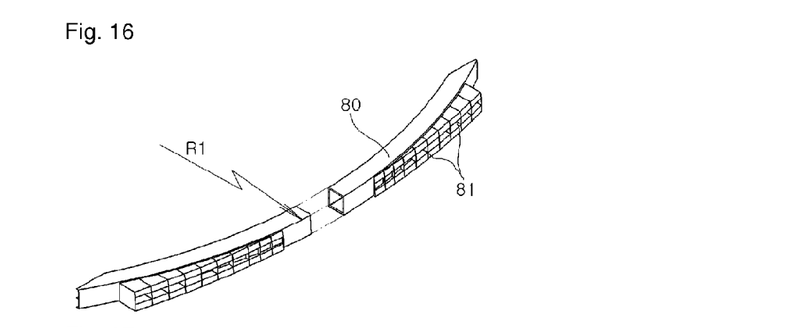
FIG. 16 is a perspective view showing the stiffener of the present invention.

The impact part 50 of the present invention is repetitively formed to have an outside space 56 which is open forwards, that is, towards a bumper and an inner space 55 which is open towards the opposite inside, as shown in FIG. 13 which shows a first embodiment.

A stiffener 80 is received in the inner space 55.

The stiffener 80 is made from a steel material or an aluminum material or a synthetic resin material having excellent strength, wherein the stiffener 80 is formed with a relatively small curvature R1 rather than that of the back beam 100, which has no curve, in the state that the stiffener 80 is positioned in the inner space 55. Further, clearances S are formed at both sides of the stiffener 80 between the inner space 55 and the stiffener 80 in the state that the center of the stiffener 80 is in contact with the center portion of the inner space 55.

At this time, the stiffener 80 is formed with a plurality of protruding ribs for filling the clearances S so as to further reinforce the allowable strength.

Further, the back beam 100 may be formed with a plurality of protruding ribs for filling the clearances S so as to further reinforce the allowable strength.

The both end portions of the stiffener 80 extend to the positions of the tower parts 60 of the vehicle back beam 100 so as to be fixed to the crush boxes 91.

Figure 22:
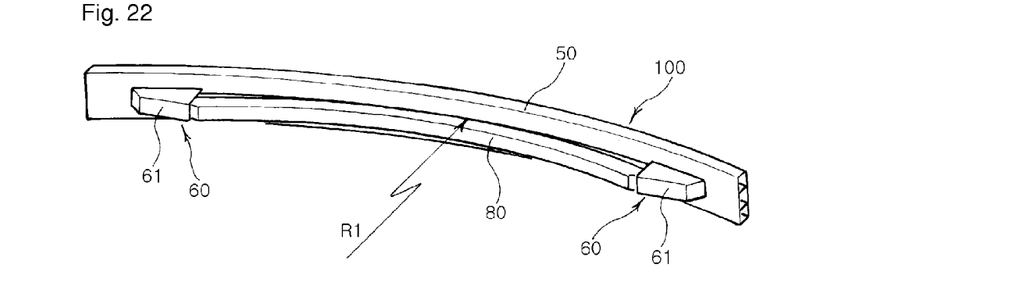
FIG. 22 is a perspective view showing a structure, in which the stiffener is mounted on a back beam which is formed with a closed section in the shape of a rectangle.

The stiffener 80 of the present invention is formed to have closed sectional portions in the shape of a "B" such that a gap is provided between an upper closed sectional portion and a lower closed sectional portion as shown in FIG. 22.

Meanwhile, inclination parts 70 may be provided to the upper and lower flanges of the body part of the vehicle back beam 100 such that the inclination parts 70 connect the impact part 50 to the tower parts 60.

Figure 11:
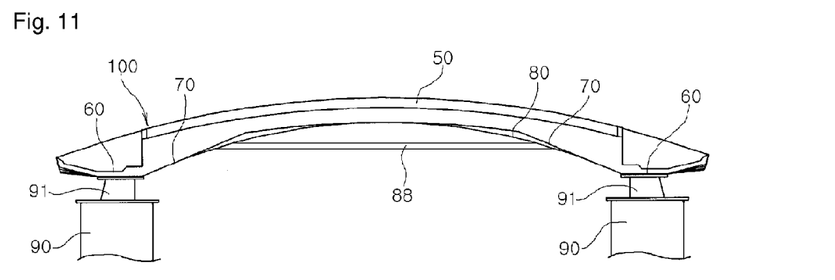
FIG. 11 is a plane view showing the mounting state of the back beam of the present invention.
Figure 12:
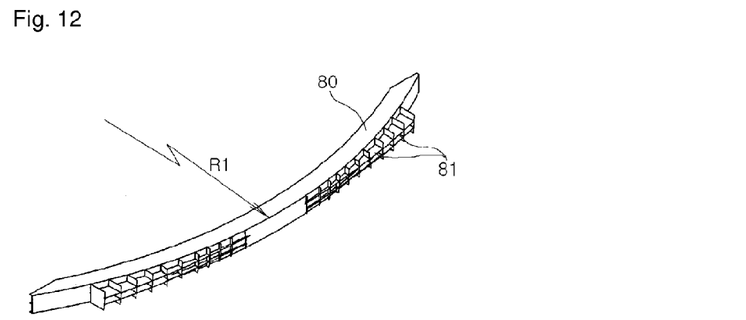
FIG. 12 is a perspective view showing the stiffener of the present invention.

Further, one or more reinforcement bars 88 may be fixed to the both end portions of the stiffener 80 so as to connect the both end portions of the stiffener 80 by crossing the both end portions of the stiffener 80 as shown in FIG. 11.

Therefore, the capacity for absorbing impacts is improved and the strength increases so that the weight of a product can be further reduced with reference to the same allowable strength and deformation can be reduced.

The size of the small curvature R1 of the stiffener 80, which is smaller than that of the back beam 100, can be changed depending on the strength required for a bumper reinforcement member, wherein the radius is decreased if the required strength is increased while the radius is increased if the required strength is decreased.

FIG. 14 to FIG. 17 show and embodiment, wherein an impact part 50 forming a vehicle back beam 100 has a section in an approximately "C" shape so as to form a single inner space 55 towards the opposite side of a bumper, that is, towards the inside.

And, a stiffener 80 having a small curvature R1 is provided in the inner space 55.

In the state that the center of the stiffener 80 is in contact with the center portion of the inner space 55, clearances S are formed at both sides of the stiffener 80 between the inner space 55 and the stiffener 80.

At this time, the stiffener 80 is formed with a plurality of protruding ribs 81 for filling the clearances S so as to further reinforce the allowable strength.

The both end portions of the stiffener 80 extend to the positions of the tower parts 60 of the vehicle back beam 100 so as to be fixed to the crush boxes 91.

Figure 17:
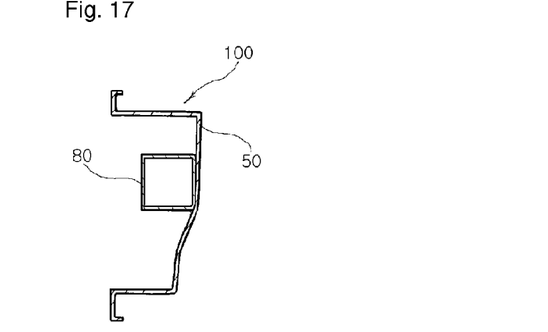
FIG. 17 is a sectional view showing the profile of the bumper back beam the present invention in an assembled state.
Figure 18:
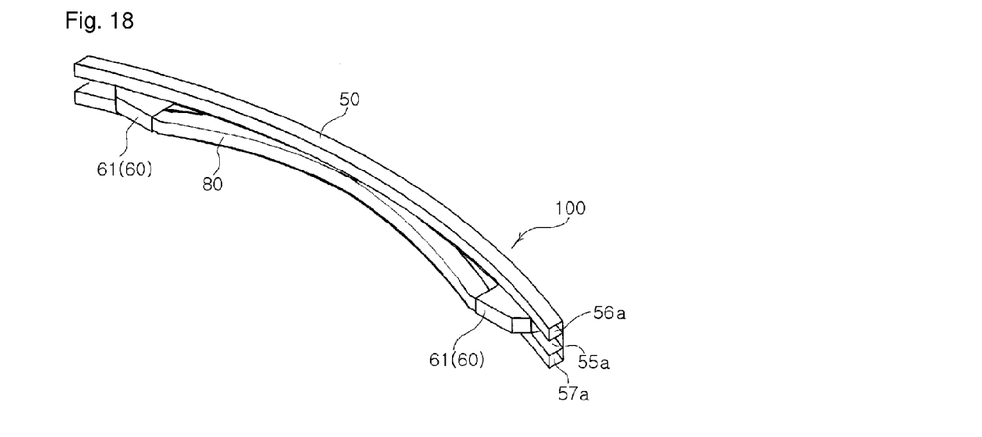
FIG. 18 is a perspective view showing a state, in which a stiffener is assembled into a bumper back beam for a vehicle according to the present invention.

In the case where the stiffener 80 of the present invention is formed with a closed sectional portion in the shape of a box as in the embodiment as shown in FIG. 17, the allowable strength is further increased.

Meanwhile, inclination parts 70 may be provided to the upper and lower part flanges of the body part of the vehicle back beam 100 and formed in a shape for connecting the impact part 50 to the tower parts 60.

Further, in a second embodiment of the present invention, one or more reinforcement bars 88 may be fixed to the both end portions of the stiffener 80 so as to connect the both end portions of the stiffener 80 by crossing the both end portions of the stiffener 80.

Therefore, the capacity for absorbing impacts is improved and the strength increases so that the weight of a product can be further reduced with reference to the same allowable strength and deformation can be reduced.

And, the size of the small curvature R1 of the stiffener 80 can be changed depending on the strength required for a bumper reinforcement member, wherein the radius is decreased if the required strength is increased while the radius is increased if the required strength is decreased.

FIG. 18 to FIG. 25 show the second embodiment of the present invention.

Figure 24:
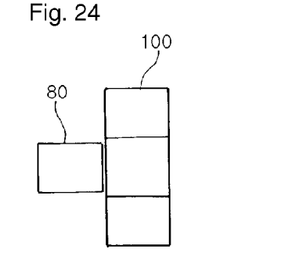
FIG. 24 is a sectional view showing the embodiment of FIG. 22.

The vehicle back beam 100 of the present invention forms a closed section in the shape of a rectangle which is long in the vertical direction as shown in FIG. 24.

And, a stiffener 80 which is formed with a small curvature R1 rather than that of the back beam 100 is provided in the back beam 100 such that clearances S are formed at both sides of the stiffener 80 between the back beam 100 and the stiffener 80.

Figure 21:
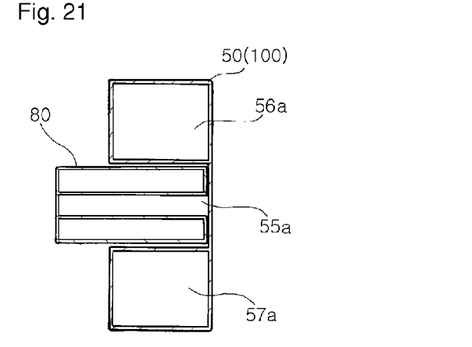
FIG. 21 is a sectional view showing a structure, in which the back beam of the present invention is divided into an upper closed sectional portion and a lower closed sectional portion such that the stiffener is mounted in a mounting space which is defined between the upper closed sectional portion and the lower closed sectional portion.

Meanwhile, as shown in FIG. 21, the back beam 100 may be formed such that the back beam 100 has closed sectional portions 56a and 57a in the vertical direction and a mounting space 55a between the closed sectional portions 56a and 57a.

And, a stiffener 80 which is made from a metal material or a synthetic resin material having excellent strength is received in the mounting space 55a, wherein the mounting space 55a and the stiffener 80 are formed with a small curvature R1 such that clearances S are formed at both sides of the stiffener 80 between the inner space 55a and the stiffener 80.

That is, the stiffener 80 is formed with a relatively small curvature R1 rather than the large curvature of the back beam 100 in the state that the stiffener 80 is positioned inside the back beam 100. Therefore, in the state that the center of the stiffener 80 is in contact with the center portion of the mounting space 55a, the clearances S are formed at both sides of the stiffener 80 between the inner space 55a and the stiffener 80.

At this time, the stiffener 80 is formed with a plurality of protruding ribs 81 for filling the clearances S so as to further reinforce the allowable strength.

The both end portions of the stiffener 80 extend to the positions of the tower parts 60 of the vehicle back beam 100 so as to be fixed to the crush boxes 91.

Figure 23:
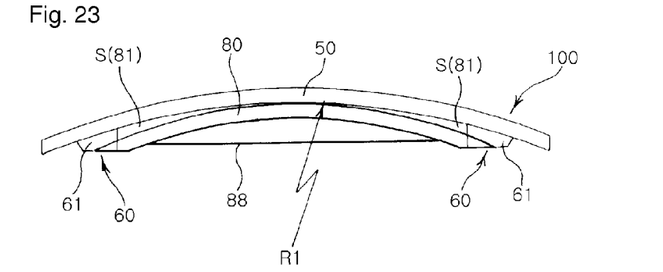
FIG. 23 is a plane view showing the embodiment of FIG. 21.

At this time, in order to mount the stiffener 80, the end portions of the stiffener 80 which extend to the tower parts 60 are mounted on the crush boxes 91 in the state that the end portions of the stiffener 80 are surrounded by the stays 61, as shown in FIG. 21 and FIG. 23.

The stays 61 are also made from a metal material which may be welded such that the stiffener 80 and the back beam 100 are respectively fixed with the stays 61 by welding so as to be integrated together.

Further, in the case where the stiffener 80 of the present invention is formed to have closed sectional portions in the shape of a "B" such that a gap is provided between an upper closed sectional portion and a lower closed sectional portion in the vertical direction as shown in FIG. 21, the allowable strength is further increased.

Figure 25A:
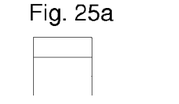
Figure 25B:
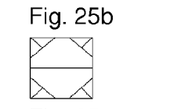
Figure 25C:
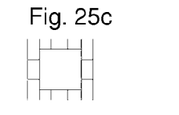

Furthermore, as shown in FIG. 25a to FIG. 25c, it is possible to provide stiffening ribs of various shape in the closed sections for the reinforcement of strength.

Figure 19:
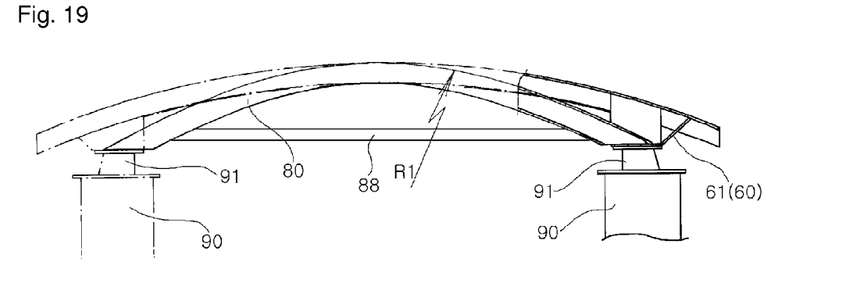
FIG. 19 is a plane view showing a difference in the curvature of the stiffener which is mounted in the back beam.
Figure 20:
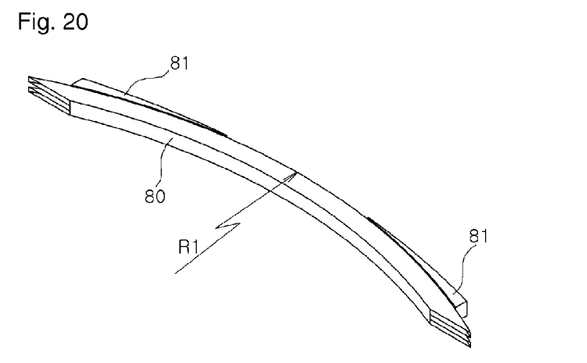
FIG. 20 is a perspective view showing the stiffener according to the present invention.

Furthermore, as shown in FIG. 19 and FIG. 23, one or more reinforcement bars 88 may be fixed to the stiffener 80 so as to connect the both ends of the stiffener 80 by crossing the both ends of the stiffener 80.

Therefore, the capacity for absorbing impacts is improved and the strength increases so that the weight of a product can be further reduced with reference to the same allowable strength and deformation can be reduced.

And, the size of the small curvature R1 of the stiffener 80 can be changed depending on the strength required for a bumper reinforcement member, wherein the radius is decreased if the required strength is increased while the radius is increased if the required strength is decreased.

Hereinafter, the embodiments of the present application will be described with respect to the operation thereof in detail.

If an impact is applied to the front part of a bumper, the impact is transmitted to the tower parts 60 through the center portion of the impact part 50, generating deformation.

In the present invention, the impact is divided by the impact part 50 and the stiffener 80 and then transmitted to the side members 90 or the crush boxes 91 on which the tower parts 60 are mounted.

At this time, an impulse is dispersed by the stiffener 80 which is formed with the small curvature R1 so as to be smoothly curved forwards. Therefore, the degrees of the deformation of and the damage to the side members 90 on which the tower parts 60 are mounted may be reduced.

Therefore, even in the case where a large impact is applied to the bumper, it is possible to prevent the breakage of the back beam as well as the side members 90. In addition, the final impact allowance may be increased and appropriate deformation may be maintained when the impact is applied.

What is claimed is:

1. In a bumper back beam for a vehicle including a bumper back beam body, the bumper back beam body comprising:
   an impact part positioned in a center portion of the back beam body and having an inner space opened toward an opposite inside portion of the bumper back beam body; and
   tower parts formed at the rear portions of the both sides of the impact part and fixed to crush boxes which are mounted on the front ends of side members of a vehicle body; and
   a stiffener received in the inner space of the bumper back beam body and fixed at its both ends to the crush boxes along with the tower parts,
   wherein the inner space and the stiffener are formed with a curvature which is smaller than that of the bumper back beam such that clearances are formed at both sides between the inner space and the stiffener.

2. The bumper back beam for a vehicle according to claim 1, wherein the stiffener or the back beam is provided with a plurality of ribs for filling the clearances so as to further reinforce allowable strength.

3. The bumper back beam for a vehicle according to claim 1, wherein the end portions of the stiffener extend to the positions of the tower parts of the vehicle back beam so as to be fixed to the crush boxes.

4. The bumper back beam for a vehicle according to claim 1, wherein the impact part is formed such that the section of the impact part respectively has an outside space which is open towards a bumper side and an inner space which is open towards the opposite inside of the bumper.

5. The bumper back beam for a vehicle according to claim 1, wherein the bumper back beam body further includes inclinations and the impact part of the vehicle back beam is formed in a shape for connecting the tower parts by inclination parts.

6. The bumper back beam for a vehicle according to claim 1, wherein at least one or more reinforcement bars are fixed to the reinforcement bars and connects the both end portions of the stiffener by crossing the both end portions of the stiffener.

7. In a bumper back beam for a vehicle, comprising:
   an impact part positioned in a center portion; and
   tower parts formed at the rear portions of the both sides of the impact part such that the tower parts are fixed to crush boxes which are mounted on the front ends of side members of a vehicle body,
   the bumper back beam for a vehicle characterized in that the vehicle back beam is formed in a closed sectional shape and a stiffener which is formed with a smaller curvature than that of the back beam is received in the vehicle back beam such that clearances are formed at both sides between the back beam and the stiffener.

8. The bumper back beam for a vehicle according to claim 7,
   wherein the back beam is provided with mounting spaces between upper and lower closed sectional portions and, and
   the stiffener which is formed with the relatively small curvature on the back beam is provided in the mounting spaces while the clearances are formed at both sides between the back beam and the stiffener.

9. The bumper back beam for a vehicle according to claim 7, wherein the stiffener is mounted with a plurality of ribs for filling the clearances so as to further reinforce allowable strength.

10. The bumper back beam for a vehicle according to claim 7, wherein the both end portions of the stiffener extend to the tower parts of the vehicle back beam so as to be fixed with the crush boxes.

11. The bumper back beam for a vehicle according to claim 7, wherein the end portions of the stiffener are respectively fixed to the back beam by welding in the state that the end portions of the stiffener are surrounded by stays so as to mount the stiffener on the back beam.

12. The bumper back beam for a vehicle according to claim 7, wherein at least one or more reinforcement bars which connect the both end portions by crossing the both end portions are fixed to the stiffener.

* * * * *